(12) United States Patent
Keller et al.

(10) Patent No.: US 10,268,437 B2
(45) Date of Patent: Apr. 23, 2019

(54) SYSTEM AND METHOD FOR DETERMINING WINDOW GEOMETRY

(71) Applicant: INTERACTIVE INTELLIGENCE GROUP, INC., Indianapolis, IN (US)

(72) Inventors: Jonathan M. Keller, Lafayette, IN (US); Phillip Gates-Idem, Durham, NC (US); Justin P. Ligman, Indianapolis, IN (US)

( * ) Notice: Subject to any disclaimer, the term of this patent is extended or adjusted under 35 U.S.C. 154(b) by 193 days.

(21) Appl. No.: 15/235,204

(22) Filed: Aug. 12, 2016

(65) Prior Publication Data
US 2017/0046112 A1  Feb. 16, 2017

Related U.S. Application Data

(60) Provisional application No. 62/203,985, filed on Aug. 12, 2015.

(51) Int. Cl.
G06F 3/14  (2006.01)
G06T 7/90  (2017.01)
(Continued)

(52) U.S. Cl.
CPC ........ *G06F 3/1454* (2013.01); *G06F 3/04845* (2013.01); *G06T 7/90* (2017.01);
(Continued)

(58) Field of Classification Search
CPC .......... G06F 17/2247; G06F 17/30241; G06F 17/30879; G06F 3/0482; G06F 3/0484; G06F 3/04817; G06F 3/0485; G06F 3/1454; H04N 21/85; H06T 19/006; G06Q 30/02; G06Q 10/10; B41J 3/445
See application file for complete search history.

(56) References Cited

U.S. PATENT DOCUMENTS 7,356,563 B1 *  4/2008  Leichtling .............. G06Q 10/06 345/2.1
9,462,017 B1 * 10/2016  Siracusano, Jr. ... H04L 65/4038
(Continued)

FOREIGN PATENT DOCUMENTS

EP    1062598 B1    10/2003

OTHER PUBLICATIONS

International Search Report and Written Opinion of International Searching Authority dated Oct. 28, 2016 in related PCT application PCT/US2016/046673, International filing date Aug. 12, 2016.

*Primary Examiner* — Quoc A Tran

(57) ABSTRACT

A system and method are presented for determining window geometry. In an embodiment, a party to an interaction using a streaming video connection may want to share content on their display with another party to the interaction. A party may wish to annotate an on-screen target for the other party. In an embodiment, markers or magic bars may also be used to map the screens to each other in addition to coordinates. When one party annotates an on-screen target on their display, the coordinates on the party's display are translated for the other party and the annotation is placed in the intended location on that party's screen. Masking of content may also be performed such that contact on one user's screen may not be visible to the other party during the screen share.

23 Claims, 3 Drawing Sheets

(51) Int. Cl.
*G09G 5/14* (2006.01)
*H04N 7/14* (2006.01)
*G06F 17/22* (2006.01)
*G06F 17/30* (2006.01)
*G06Q 10/10* (2012.01)
*G06Q 30/02* (2012.01)
*G06T 11/80* (2006.01)
*H04N 21/85* (2011.01)
*G06F 3/0481* (2013.01)
*G06F 3/0484* (2013.01)
*G06F 3/0485* (2013.01)
*G06F 17/00* (2006.01)

(52) U.S. Cl.
CPC ............ *G06T 11/80* (2013.01); *H04N 7/147* (2013.01); *G06F 3/0485* (2013.01); *G06F 3/04817* (2013.01); *G06F 17/2247* (2013.01); *G06F 17/30241* (2013.01); *G06F 17/30879* (2013.01); *G06Q 10/10* (2013.01); *G06Q 30/02* (2013.01); *G06T 2207/30204* (2013.01); *G09G 5/14* (2013.01); *G09G 2358/00* (2013.01); *H04N 21/85* (2013.01)

(56) References Cited

U.S. PATENT DOCUMENTS

| | | |
|---|---|---|
| 2002/0145610 A1 | 10/2002 | Barilovits et al. |
| 2013/0024418 A1* | 1/2013 | Sitrick ................. G06Q 10/101 707/608 |
| 2014/0047332 A1* | 2/2014 | Liu .......................... G06F 17/24 715/273 |
| 2014/0063174 A1 | 3/2014 | Junuzovic et al. |
| 2014/0223490 A1* | 8/2014 | Pan ................... H04N 21/42224 725/61 |
| 2014/0359481 A1* | 12/2014 | Dawson ................. G06Q 10/10 715/753 |
| 2015/0033109 A1* | 1/2015 | Marek .................... G06F 17/241 715/230 |
| 2015/0181207 A1 | 6/2015 | Agrawal et al. |
| 2015/0293588 A1* | 10/2015 | Strupczewski .......... G06T 17/10 382/117 |
| 2016/0147399 A1* | 5/2016 | Berajawala ........... G06F 17/241 715/753 |
| 2017/0286368 A1* | 10/2017 | Osindero .............. G06F 17/212 |

* cited by examiner ial appli-
SYSTEM AND METHOD FOR DETERMINING WINDOW GEOMETRY

CROSS REFERENCE TO RELATED APPLICATIONS

This application claims priority to U.S. provisional application 62/203,985 filed Aug. 12, 2015, entitled "SYSTEM AND METHOD FOR DETERMINING WINDOW GEOMETRY", the contents of which are incorporated herein

BACKGROUND

The present invention generally relates to telecommunications systems and methods, as well as streaming video connections. More particularly, the present invention pertains to screen sharing during an interaction.

SUMMARY

A system and method are presented for determining window geometry. In embodiment, a party to an interaction using a streaming video connection may want to share content on their display with another party to the interaction. A party may wish to annotate an on-screen target for the other party. In an embodiment, markers or magic bars may also be used to map the screens to each other in addition to coordinates. When one party annotates an on-screen target on their display, the coordinates on the party's display are translated for the other party and the annotation is placed in the intended location on that party's screen. Masking of content may also be performed such that contact on one user's screen may not be visible to the other party during the screen share.

In one embodiment, a method is presented for annotating a target in a display associated with a second user, by a first user, wherein the display is remotely shared by the first and second user via a streaming video connection during the course of an interaction, the method comprising: adding a marker on the display associated with the second user with at least one point for dimension; mapping coordinates in the display of the first user with coordinates in the display associated with the second user using the marker; drawing, manually, on the display associated with the second user, by the second user, a shape; wherein the computer of the second user interprets the coordinates in the display associated with the second user of the shape by searching for the marker in the streaming video connection associated with first user; translating the coordinates in the display of the first user of the drawn shape into the coordinates associated with the second user, and drawing automatically, by the computer of the second user, the shape in the intended location on the display associated with the second user.

In another embodiment, a method is presented for annotating a target in a display associated with a second user, by a first user, wherein the display is remotely shared by the first and second user via a streaming video connection during the course of an interaction, the method comprising: adding a marker on the display associated with the second user with at least one point for dimension; mapping coordinates in the display of the first user with coordinates in the display associated with the second user using the marker; drawing, manually, on the display associated with the second user, by the second user, a shape; wherein the computer of the second user interprets the coordinates in the display associated with the second user of the shape by searching for the marker in the streaming video connection associated with first user, and wherein the content in the shape drawn by the second user is masked from the first user; translating the coordinates in the display of the first user of the drawn shape into the coordinates associated with the second user; and drawing automatically, by the computer of the second user, the shape in the intended location on the display associated with the second user.

DETAILED DESCRIPTION

Figure 1:
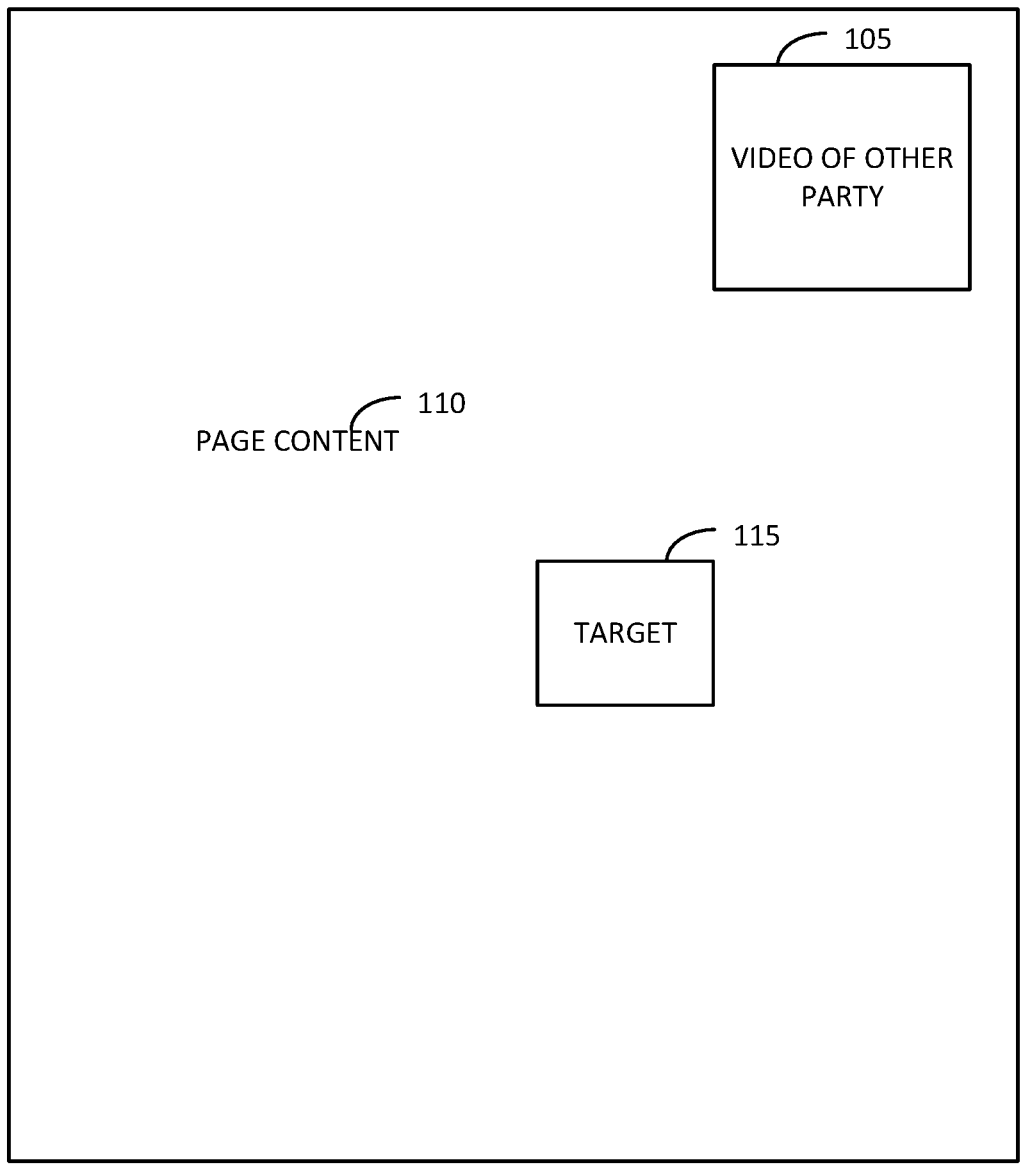
FIG. 1 is a diagram illustrating an example of a shared display.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

In an embodiment, a customer service agent working in a contact center environment, may be interacting with a customer via several forms of media. For example, a web chat or a video chat may be occurring or perhaps a screen share between the customer service agent and the customer is occurring. In a non-limiting example, the customer may be speaking with the customer service agent and the customer may say "I can't figure out where the button is you are telling me to click". The customer service agent may request a screen share with the customer. The screen share may be accomplished in a number of manners, such as through a URL, a request in a chat, or a button on a website. In the screen share, the size of the browser window may not be known on the customer service agent's side, nor is this controlled. The customer may opt to share the content in their device's display with the agent via a streaming video connection during the course of the interaction. In an embodiment, the agent may wish to annotate an on-screen target. For example, the agent may be talking to the customer about filling out an order form for a service. The agent may wish to circle a button on a form and verbally tell the customer to "click here", as the agent may not be allowed to just click on the button for the customer due to legal issues or other reasons. The agent may also wish to draw an arrow pointing to a form field in which the user must enter information, such as a type of product the customer wishes to order.

FIG. 1 is diagram illustrating an example of a shared display, indicated generally at 100. For example, the display 100 may be seen by either party in their display during an interaction. Each party may be able to view a live video stream 105 of each other as well as page content 110. Using the example described previously of a contact center customer service agent and a customer, the target 115 may be visible and highlighted in a format that the agent points to the customer to see, such a field on an on-line order form. The video stream 105 and the target 115 are not required to be fixed in the positions illustrated here. In an embodiment, the video stream 105 may not even be present. It is included here for a non-limiting example of an embodiment. They are only shown as an example and it is within the scope of the embodiments described herein for them to be placed in other positions in the display.

Figure 2:
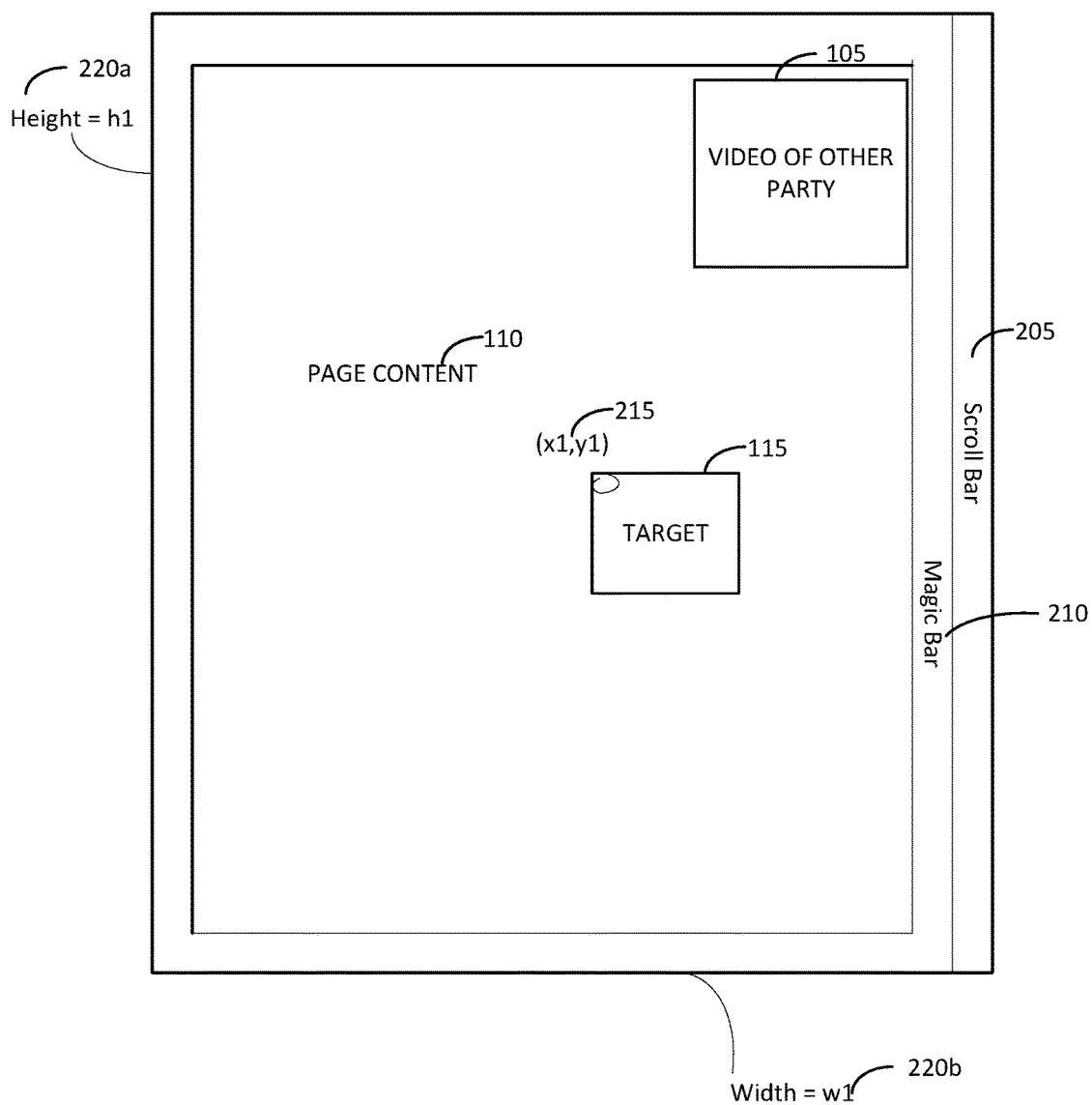
FIG. 2 is a diagram illustrating an example of user display.

FIG. 2 is a diagram illustrating an example of user display, indicated generally at 200. The user display 200 may comprise what the customer is seeing on their display associated with their user device during the interaction. A user device may comprise a PC or a laptop as well as tablets and or smartphones, to name a few non-limiting examples. In the customer's display 200, the video of the other party 105, the page content 110, and the target 115 may be present. The target 115 may comprise the area the agent wishes to annotate, such as by drawing a circle around it, highlighting, drawing a pointer, etc., for example. Additional elements may also be present in the form of a scroll bar 205, a magic bar, 210, coordinates 215, and page dimensions 220a, 220b.

The scroll bar 205 may be used by the customer to scroll around the display's content. While a customer is using the scroll bar 205, the content of the customer service agent's display may remain in a fixed position during the interaction. In an embodiment, a display 200 may also not include the scroll bar 205 if the window is not scrollable, depending on the size and content of the page in the display. Additionally, the video of the other party 105 may remain in a fixed position during scrolling.

The magic bar 210 may be used to determine the page dimensions 220a, 220b. A magic bar 210 may comprise a plurality of sides of the display page as a border. In an embodiment, the magic bar 210 serves as a reference with at least one point for dimension for mapping the agent screen coordinates to the customer's screen coordinates.

In another embodiment, the magic bar 210 may be replaced with a marker or a plurality of markers positioned strategically around the screen. In an embodiment, the marker may comprise pixel color variations which are subtle enough to be invisible to the human eye, but able to be detected by software on the customer service agent end of the video stream. In another embodiment, the marker may comprise a visible marker, such as an icon or a logo. The position of the marker may also remain fixed if the window is scrolled by the customer using the scroll bar 205. The marker may also comprise a reference point which has a numeric position, used for mapping the agent screen coordinates with those of the customer's. In an embodiment, a numeric position is encoded using color values of a grouping of pixels. For example, to indicate the number '3', the (R,G,B) color values of a certain group of pixels may be increased by 1 in the red channel, 1 in the green channel, and 1 in the blue channel, for a total of '3'. In another embodiment, it is determined by using a target's position as multiples of a reference point's height and width. In another embodiment, dots encode offsets from an edge of the display. In yet another embodiment, the number position may be encoded using a pattern of dots with different hues or intensities than the surrounding display content. For example, a pattern of pixels whose shape spatially conveys the number '3' could be displayed in a color that differs from the background by an (R,G,B) value of (0,0,1). The marker may also encode horizontal and vertical positions on the page with respect to the customer's coordinate system.

Coordinates 215 may be used to map the customers screen to the agent's screen. Due to varying screen resolutions, window sizes, etc., the coordinates by the target in the customer's window may differ from those of the same target in the customer service agent's window illustrated generally below in FIG. 3. Coordinates 215 may be presented as a function of the height and width of the customer's display. For illustrative purposes, they are exemplified in FIG. 2 as (x1, y1) at 215.

The page dimensions 220a, 220b, may represent the height of the customer's display 200 and the width of the customer's display 200, respectively, and are used by the system to determine coordinates 215 of a target 115.

Figure 3:
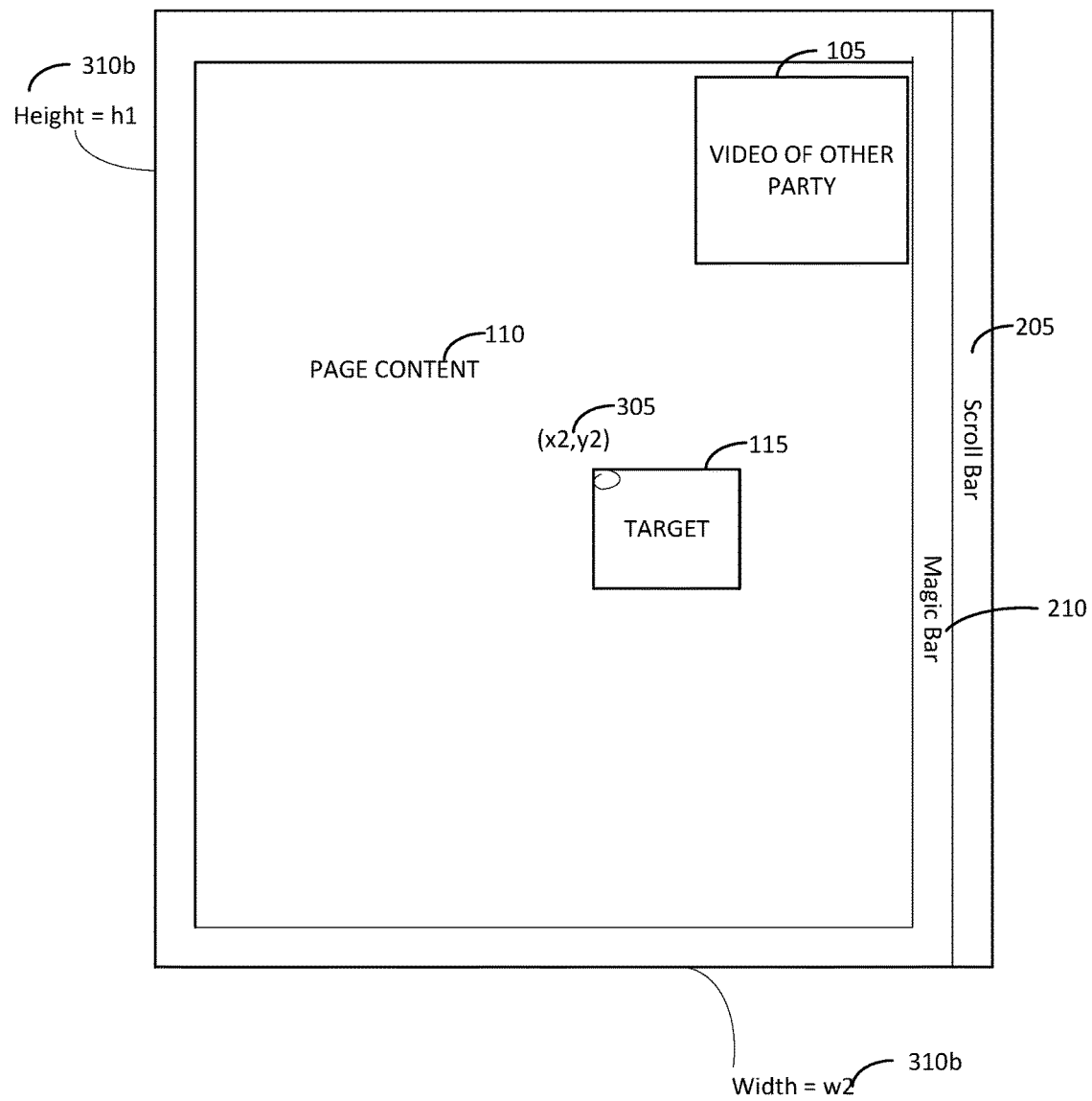
FIG. 3 is a diagram illustrating an example of an other user display.

FIG. 3 is a diagram illustrating an example of an other user display, indicated generally at 300. The customer service agent's display 300 may be what the agent is seeing on their display associated with their user device during the interaction with the customer. The agent's window comprises similar content to what the user has in their display 200, however, the agent's window 300 may have different coordinates 305 and different page dimensions 310a, 310b.

In an embodiment, the customer service agent may circle the target button 115. The coordinates of the customer may differ from those of the agent and thus a coordinate translation needs to be performed. Factors need to be considered such as: whether the customer has scrolled on their page and how far, the factor by which the video connection has up/downscaled the customer's page for display on the agent's screen, the width of any margins added in the video connection to compensate for differences in aspect ratio, etc.

In an embodiment, when an agent draws on the screen (such as via a mouse or with a finger or device on a touch screen), the customer-side coordinates of the marker or magic bar may be interpreted on the agent's machine, by the computer, by searching for the marker in the incoming video stream. The agent-side coordinates of the drawn shape may then be translated into customer-side coordinates. The customer-side shape coordinates may then be sent to the customer's browser along with a description of the shape to be drawn (e.g., "red circle, radius 40, center (100,200)). The customer's computer will then draw the shape in the intended location on the customer's screen.

In an embodiment, certain visual information, such as text or images, may need to be redacted or hidden from view by for example, blurring or blacking out the content. Masking of content on the agent's screen may also be performed, such as in cases where a customer is providing credit card information or other sensitive information. Code on the customer's side may process the outgoing video stream and censor any windows which do not have the marker or a marking border. Other targeted areas may also be censored in the display allowing a customer to not unintentionally share private data with an agent. This masking may be performed on the agent's side as an unmasked video stream is received, such as in instances where web real-time communications are used (e.g., WebRTC).

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method for annotating a target in an image displayed on a display device associated with a second user, by a first user, wherein the image displayed on the display device associated with the second user is remotely shared by a display device associated with the first user via a streaming video connection during an interaction, the method comprising:
a. identifying a marker corresponding to the display device associated with the second user, the marker having at least one point for dimension;
b. mapping coordinates corresponding to the display device of the first user with coordinates corresponding to the display device associated with the second user using the marker;
c. identifying data reflecting a manual drawing input of a shape by the first user on the display device associated with the first user,
wherein a computer corresponding to the display device of the first user interprets the coordinates corresponding to the display device associated with the second user of the shape by searching for the marker in the streaming video connection,
d. translating during the interaction, based on a movement of the image displayed on the display device associated with the second user, the coordinates corresponding to the display device associated with the first user of the shape into the coordinates corresponding to the display device associated with the second user; and
e. transmitting a signal for drawing automatically, by a computer corresponding to the display device of the second user, the shape in an intended location on the display device associated with the second user,
wherein the marker has a numeric position;
wherein the numeric position is encoded by determining a target's position as multiples of a reference point's height and width.

2. The method of claim 1, wherein the numeric position is encoded using color values of a grouping of pixels.

3. The method of claim 1, wherein the numeric position is encoded using dots encoding offsets from an edge of the display device associated with the second user.

4. The method of claim 1, wherein the numeric position is encoded using a pattern of dots with differences from surrounding content.

5. The method of claim 1, wherein the marker comprises a magic bar, wherein the magic bar encompasses a plurality of sides of a page as a border.

6. The method of claim 1, wherein the marker comprises pixel color variations able to be detected by software.

7. The method of claim 1, wherein the marker comprises an icon.

8. The method of claim 1, wherein the marker is capable of remaining fixed when a window of the display device associated with the second user scrolls.

9. The method of claim 1, wherein the marker comprises a machine recognizable pattern.

10. The method of claim 1, wherein the marker comprises a measurable shape.

11. The method of claim 1, wherein the translating comprises sending the coordinates in the display device associated with the first user to a browser associated with the second user and a description of the drawing.

12. A method for annotating a target in an image displayed on a display device associated with a second user, by a first user, wherein the image displayed on the display device associated with the second user is remotely shared by a display device associated with the first user via a streaming video connection during an interaction, the method comprising:
a. identifying a marker corresponding to the display device associated with the second user, the marker having at least one point for dimension;
b. mapping coordinates corresponding to the display device of the first user with coordinates corresponding to the display device associated with the second user using the marker;
c. identifying data reflecting a manual drawing input of a shape by the first user on the display device associated with the first user, by the first user;
  i. wherein a computer corresponding to the display device of the first user interprets the coordinates corresponding to the display device associated with the second user of the shape by searching for the marker in the streaming video connection, and
  ii. wherein content in the shape drawn by the first user is masked from the second user;
d. translating during the interaction, based on a movement of the image displayed on the display device associated with the second user, the coordinates corresponding to the display device associated with the first user of the shape into the coordinates corresponding to the display device associated with the second user; and
e. transmitting a signal for drawing automatically, by a computer corresponding to the display device of the second user, the shape in an intended location on the display device associated with the second user,
wherein the marker has a numeric position;
wherein the numeric position is encoded by determining a target's position as multiples of a reference point's height and width.

13. The method of claim 12, wherein masking comprises computer-visible content entered by the second user and not visible to the first user.

14. The method of claim 12, wherein the numeric position is encoded using color values of a grouping of pixels.

15. The method of claim 12, wherein the numeric position is encoded using dots encoding offsets from an edge of the display device associated with the second user.

16. The method of claim 12, wherein the numeric position is encoded using a pattern of dots with hues different from surrounding content.

17. The method of claim 12, wherein the marker comprises a magic bar, wherein the magic bar encompasses a plurality of sides of a page as a border.

18. The method of claim 12, wherein the marker comprises pixel color variations able to be detected by software.

19. The method of claim 12, wherein the marker comprises an icon.

20. The method of claim 12, wherein the marker is capable of remaining fixed when a window of the display device associated with the second user scrolls.

21. The method of claim 12, wherein the marker comprises a machine recognizable pattern.

22. The method of claim 12, wherein the marker comprises a measurable shape.

23. The method of claim 12, wherein the translating comprises sending the coordinates in the display device associated with the first user to a browser associated with the second user and a description of the drawing.

* * * * *